(12) United States Patent
Li et al.

(10) Patent No.: US 12,229,882 B2
(45) Date of Patent: Feb. 18, 2025

(54) METHOD FOR ADJUSTING TARGET OBJECT, ELECTRONIC DEVICE, AND STORAGE MEDIUM

(71) Applicant: Beijing Baidu Netcom Science Technology Co., Ltd., Beijing (CN)

(72) Inventors: Sha Li, Beijing (CN); Yaqian Shen, Beijing (CN); Zhidong Yin, Beijing (CN); Zhixiang Chen, Beijing (CN)

(73) Assignee: Beijing Baidu Netcom Science Technology Co., Ltd., Beijing (CN)

( * ) Notice: Subject to any disclaimer, the term of this patent is extended or adjusted under 35 U.S.C. 154(b) by 145 days.

(21) Appl. No.: 17/989,996

(22) Filed: Nov. 18, 2022

(65) Prior Publication Data

US 2023/0419601 A1    Dec. 28, 2023

(30) Foreign Application Priority Data

Jun. 8, 2022    (CN) .......................... 202210646167.X

(51) Int. Cl.
*G06T 17/00*    (2006.01)
(52) U.S. Cl.
CPC .......... *G06T 17/00* (2013.01); *G06T 2210/12* (2013.01); *G06T 2215/16* (2013.01)
(58) Field of Classification Search
CPC ......... G06T 17/00; G06T 17/05; G06T 19/00; G06T 2207/10028; G06V 10/255; G06V 20/58–588
See application file for complete search history.

(56) References Cited

U.S. PATENT DOCUMENTS

| | | | |
|---|---|---|---|
| 2019/0012807 A1 | 1/2019 | Sun et al. | |
| 2019/0197785 A1* | 6/2019 | Tate-Gans | ............. G06T 19/006 |

FOREIGN PATENT DOCUMENTS

| | | | | |
|---|---|---|---|---|
| CN | 109542321 A | * | 3/2019 | ......... G06F 3/04845 |
| CN | 109543231 A | | 3/2019 | |
| CN | 109872397 A | | 6/2019 | |
| CN | 110321048 A | | 10/2019 | |

(Continued)

OTHER PUBLICATIONS

Tang, Jie, et al. "A textured object recognition pipeline for color and depth image data." 2012 IEEE International Conference on Robotics and Automation. IEEE (Year: 2012).*

(Continued)

*Primary Examiner* — Diane M Wills
(74) *Attorney, Agent, or Firm* — Knobbe, Martens, Olson & Bear, LLP

(57) ABSTRACT

Provided is a method for adjusting a target object, an electronic device, and a storage medium, relating to a field of computer technology, and in particular, to fields of intelligent transportation, automatic driving, computer vision, and the like. The method includes: acquiring a first bounding box corresponding to the target object and a second bounding box corresponding to a support of the target object; obtaining an association relationship for adjustment of the target object, according to a spatial position where the first and second bounding boxes are located; and moving, according to the association relationship, the target object towards the support, to obtain a third bounding box corresponding to the adjusted target object, where the third bounding box and the second bounding box appear to fit each other.

12 Claims, 9 Drawing Sheets

(56) References Cited

FOREIGN PATENT DOCUMENTS

| CN | 111984171 A | * 11/2020 | ......... G06F 3/04845 |
|----|-------------|-----------|------------------------|
| CN | 113658170 A | 11/2021 | |
| CN | 114140813 A | 3/2022 | |
| CN | 114202640 A | 3/2022 | |
| CN | 114298908 A | 4/2022 | |
| CN | 114470782 A | 5/2022 | |
| CN | 114494602 A | 5/2022 | |
| CN | 114565721 A | 5/2022 | |
| WO | WO 2022/044755 A1 | 3/2022 | |

OTHER PUBLICATIONS

First Office Action from The State Intellectual Property Office of People's Republic of China for Application No. 202210646167.X dated Jun. 29, 2023 in 15 pages.

Second Office Action from The State Intellectual Property Office of People's Republic of China for Application No. 202210646167.X dated Sep. 7, 2023 in 14 pages.

Notification to Grant Patent Right for Invention from The State Intellectual Property Office of People's Republic of China for Application No. 202210646167.X dated Jan. 2, 2024 in 5 pages.

* cited by examiner

Before adjustment ⇒ After adjustment

Before adjustment ⇒ After adjustment

Before adjustment ⇒ After adjustment

METHOD FOR ADJUSTING TARGET OBJECT, ELECTRONIC DEVICE, AND STORAGE MEDIUM

CROSS-REFERENCE TO RELATED APPLICATIONS

The present application claims the priority of Chinese Patent Application No. 202210646167.X, filed with the China National Intellectual Property Administration on Jun. 8, 2022, the disclosure of which is hereby incorporated herein by reference in its entirety.

TECHNICAL FIELD

The present disclosure relates to a field of computer technology, and in particular, to fields of intelligent transportation, automatic driving, computer vision, and the like.

BACKGROUND

In a scenario, such as intelligent transportation or automatic driving, it is necessary to detect a target object around a vehicle or a road, to assist a driver to analyze and learn road information, speed limiting information, or the like, so as to control a driving behavior of the driver, such as controlling steering of a steering wheel, braking, accelerating, decelerating. In a driverless scenario, it is also necessary to control the steering of the steering wheel, the braking, the accelerating, and/or the decelerating, in combination with the detected target object.

Under three-dimensional (3D) modeling, there may be errors in the detection of the target object such as a sign on the road and a support of the target object, which results in a large number of problems such as intersection and non-fitting between the target object and the support of the target object, thus the target object needs to be adjusted.

SUMMARY

The present disclosure provides a method and apparatus for adjusting a target object, an electronic device, and a storage medium.

According to an aspect of the present disclosure, provided is a method for adjusting a target object, including: acquiring a first bounding box corresponding to the target object and a second bounding box corresponding to a support of the target object; obtaining an association relationship for adjustment of the target object, according to a spatial position where the first and second bounding boxes are located; and moving, according to the association relationship, the target object towards the support, to obtain a third bounding box corresponding to the adjusted target, where the third bounding box and the second bounding box appear to fit each other.

According to another aspect of the present disclosure, provided is an apparatus for adjusting a target object, including: an acquisition module configured to acquire a first bounding box corresponding to the target object and a second bounding box corresponding to a support of the target object; a relationship determination module configured to obtain an association relationship for adjustment of the target object, according to a spatial position where the first and second bounding boxes are located; and an adjustment module configured to move, according to the association relationship, the target object towards the support, to obtain a third bounding box corresponding to the adjusted target object, where the third bounding box and the second bounding box appear to fit each other.

According to another aspect of the present disclosure, provided is an electronic device, including: at least one processor; and a memory connected in communication with the at least one processor. The memory stores an instruction executable by the at least one processor, and the instruction, when executed by the at least one processor, enables the at least one processor to execute the method provided by any embodiment of the present disclosure.

According to another aspect of the present disclosure, provided is a non-transitory computer-readable storage medium storing a computer instruction thereon, and the computer instruction is used to cause a computer to execute the method provided by any embodiment of the present disclosure.

According to another aspect of the present disclosure, provided is a computer program product including a computer program, and the computer program implements the method provided by any embodiment of the present disclosure, when executed by a processor.

With the present disclosure, the first bounding box corresponding to the target object and the second bounding box corresponding to the support of the target object may be acquired, to obtain the association relationship for the adjustment of the target object, according to the spatial position where the first and second bounding boxes are located. The target object may be moved towards the support according to the association relationship, to obtain the third bounding box corresponding to the adjusted target object, and the third bounding box and the second bounding box appear to fit each other. Since the target object in 3D modeling may be adjusted accurately, an effect that the target object and the support of the target object fit each other may be achieved.

It should be understood that the content described in this part is not intended to identify key or important features of embodiments of the present disclosure, nor is it used to limit the scope of the present disclosure. Other features of the present disclosure will be easily understood by the following description.

BRIEF DESCRIPTION OF THE DRAWINGS

The accompanying drawings are used to better understand the present solution, and do not constitute a limitation to the present disclosure.

DETAILED DESCRIPTION

Hereinafter, descriptions to the exemplary embodiments of the present disclosure are made with reference to the accompanying drawings, include various details of the embodiments of the present disclosure to facilitate understanding, and should be considered as merely exemplary. Therefore, those having ordinary skill in the art should realize, various changes and modifications may be made to the embodiments described herein, without departing from the scope and spirit of the present disclosure. Likewise, for clarity and conciseness, descriptions of well-known functions and structures are omitted in the following descriptions.

The term "and/or" herein only describes an association relation of associated objects, which indicates that there may be three kinds of relations, for example, A and/or B may indicate that there is only A exists, or there are both A and B exist, or there is only B exists. The term "at least one" herein indicates any one of many items, or any combination of at least two of the many items, for example, at least one of A, B, or C may indicate any one or more elements selected from a set of A, B, and C. The term "first" and "second" herein indicate a plurality of similar technical terms and use to distinguish them from each other, but do not limit an order of them or limit that there are only two items, for example, a first feature and a second feature indicate two types of features/two features, a quantity of the first feature may be one or more, and a quantity of the second feature may also be one or more.

In addition, in order to better illustrate the present disclosure, numerous specific details are given in the following specific implementations. Those having ordinary skill in the art should be understood that the present disclosure may be performed without certain specific details. In some examples, methods, means, elements and circuits well known to those having ordinary skill in the art are not described in detail, in order to highlight the subject matter of the present disclosure.

3D vector data is a basis of large-scale 3D modeling, and may be used to support requirements of visual rendering and business query statistics of intelligent transportation and intelligent cities. A road sign and a support of the road sign are important part of the 3D modeling. The 3D modeling has corresponding bounding boxes for the road sign and the support of the road sign, and then a position and an angle of each bounding box are adjusted manually.

Since each bounding box is independent of each other, there may be an error in identification for the road sign and the support of the road sign. There may be a large number of problems such as intersection and non-fitting, if the road sign and the support of the road sign are 3D modeled directly based on the bounding boxes. Furthermore, manual adjustment in the 3D space has high cost, is not conductive to mass production, and also has a poor adjustment effect.

Figure 1:
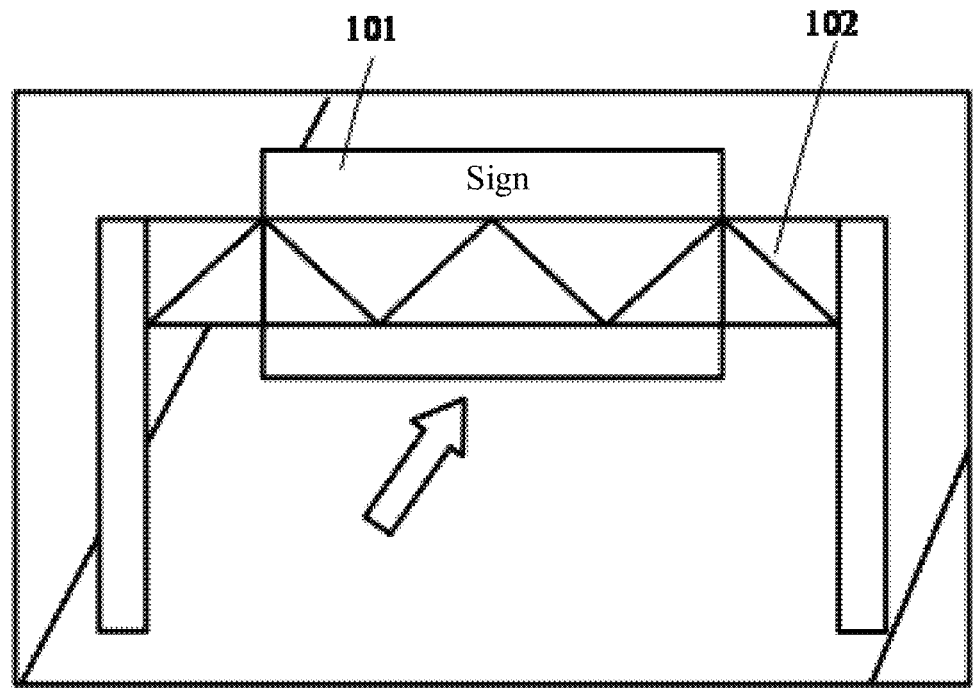
FIGS. 1-3 are schematic diagrams of problems such as intersection or non-fitting present in 3D modeling according to the embodiments of the present disclosure.
Figure 2:
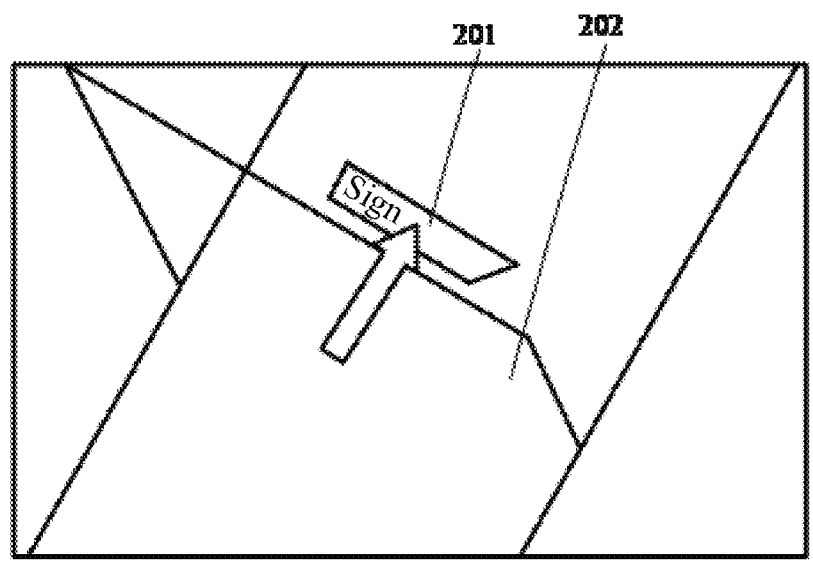
Figure 3:
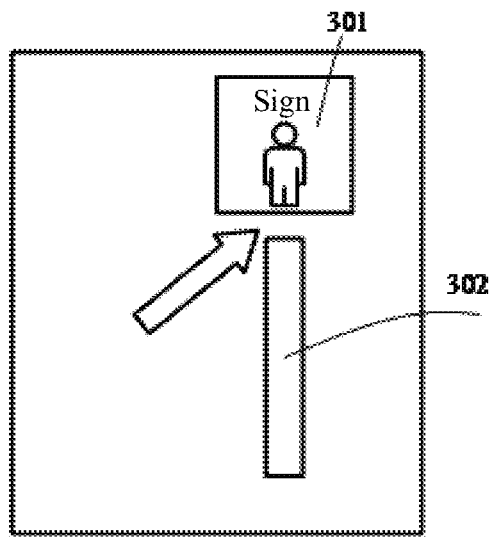

FIGS. 1-3 are schematic diagrams of problems such as intersection or non-fitting present in 3D modeling. As shown in FIG. 1, a sign 101 intersects with a gantry 102 that is a support of the sign. As shown in FIG. 2, a sign 201 does not fit a rod 202 that is a support of the sign (i.e., there is a hollow between the sign 201 and the rod 202). As shown in FIG. 3, a sign 301 does not fit a rod 302 that is a support of the sign (i.e., there is a gap between the sign 301 and the rod 302 due to the non-fitting).

Figure 4:
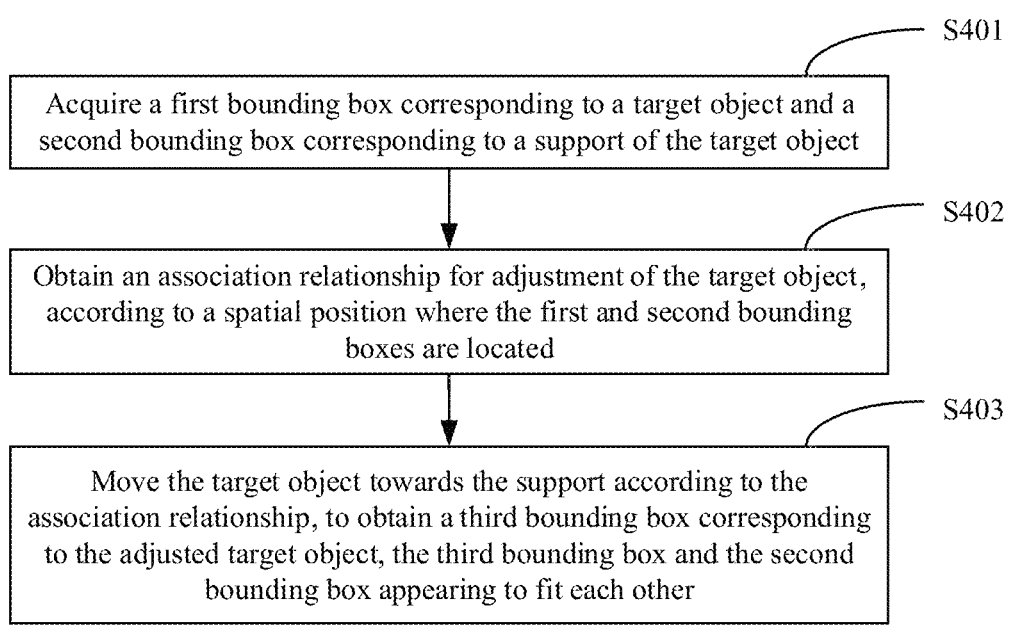
FIG. 4 is a schematic flow diagram of a method for adjusting a target object according to the embodiments of the present disclosure.

According to the embodiments of the present disclosure, a method for adjusting a target object is provided. FIG. 4 is a schematic flow diagram of the method for adjusting the target object according to the embodiments of the present disclosure. The method may be applied to an apparatus for adjusting a target object. For example, the apparatus may be deployed in a terminal, a server or other processing device in a single machine, multi-machines, or a cluster system, and may realize a process such as adjustment of the target object. The terminal may be a user equipment (UE), a mobile device, a personal digital assistant (PDA), a handheld device, a computing device, an on-board device, a wearable device, or the like. In some possible implementations, the method may also be implemented by a processor calling a computer-readable instruction stored in a memory. As shown in FIG. 4, a flow of the method includes the followings.

In S401, a first bounding box corresponding to the target object and a second bounding box corresponding to a support of the target object are acquired.

In S402, an association relationship for adjustment of the target object is obtained, according to a spatial position where the first and second bounding boxes are located.

In S403, the target object is moved towards the support according to the association relationship, to obtain a third bounding box corresponding to the adjusted target object, and the third bounding box and the second bounding box appear to fit each other.

In an example of S401-S403, a plurality of bounding boxes are included in the 3D modeling, and at least include the first bounding box corresponding to the target object, such as a sign, an indicator board, a speed limiting board, and the second bounding box corresponding to the support of the target object, such as a gantry, a cross rod, a vertical rod. The first and second bounding boxes may have a 3D form, thus the association relationship for the adjustment of the target object, such as a relative position or angle between the first and second bounding boxes, is obtained according to the spatial position where the first and second bounding boxes are located.

With the present disclosure, the first bounding box corresponding to the target object and the second bounding box corresponding to the support of the target object may be acquired to obtain the association relationship for the adjustment of the target object according to the spatial position where the first and second bounding boxes are located. The target object may be moved towards the support according to the association relationship to obtain the third bounding box corresponding to the adjusted target object, and the third bounding box and the second bounding box appear to fit each other. Since the target object in the 3D modeling may be accurately adjusted, an effect that the bounding box of the target object and the bounding box of the support of the target object fit each other may be achieved.

Figure 5:
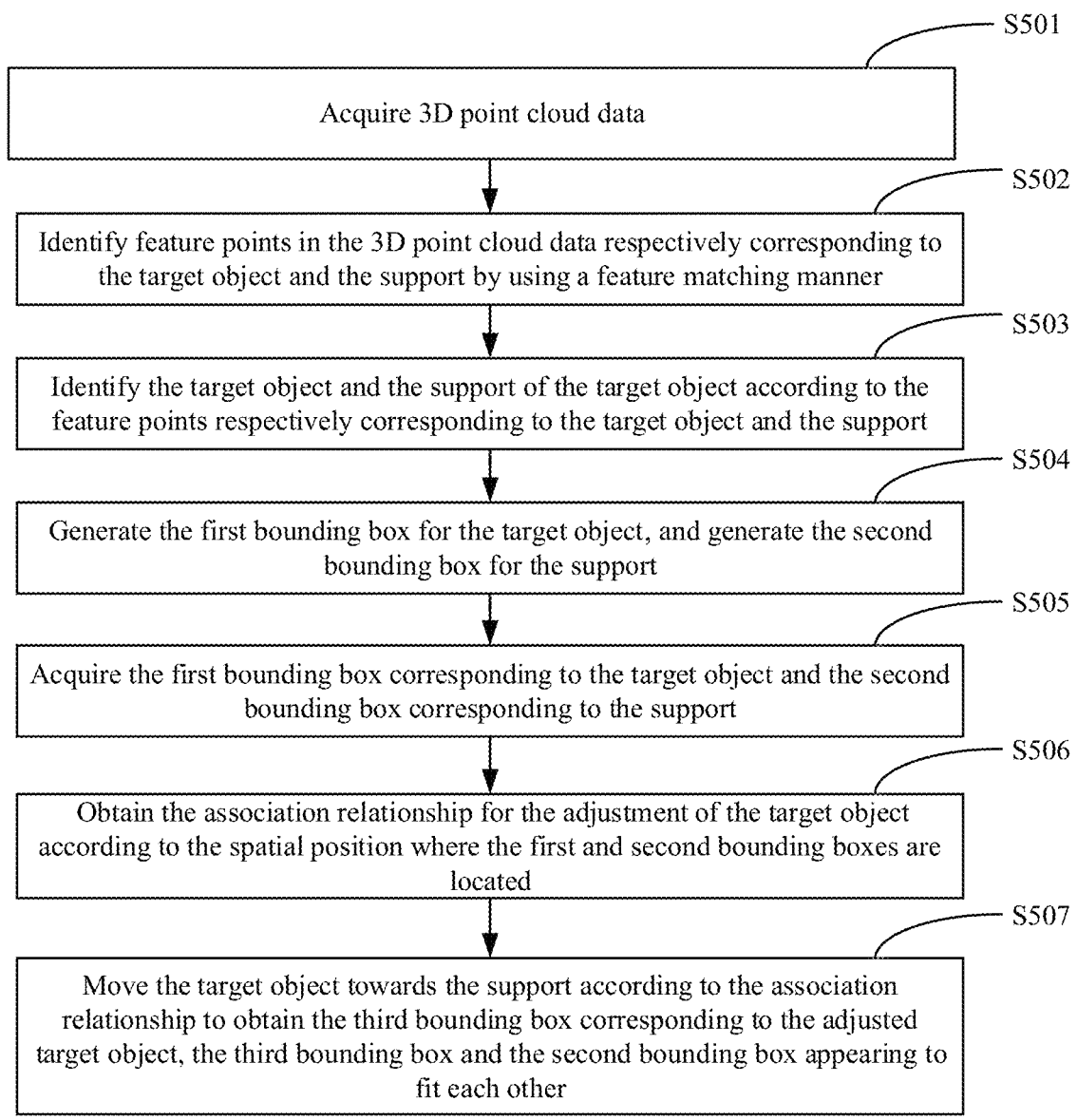
FIG. 5 is a schematic flow diagram of a method for adjusting a target object according to the embodiments of the present disclosure.

According to the embodiments of the present disclosure, the method for adjusting the target object is provided. FIG. 5 is a schematic flow diagram of the method for adjusting the target object according to the embodiments of the present disclosure. As show in FIG. 5, a flow of the method includes the followings.

In S501, 3D point cloud data is acquired.

In some examples, the 3D point cloud data may be obtained through point cloud fusion processing.

In S502, feature points in the 3D point cloud data respectively corresponding to the target object and the support are identified by using a feature matching manner.

In some examples, the feature points in the 3D point cloud data that are respectively corresponding to the target object and the support are identified, by using a feature matching manner for point cloud feature points in the 3D point cloud data.

In S503, the target object and the support of the target object are identified according to the feature points respectively corresponding to the target object and the support.

In some examples, the target object may be the sign, the indicator board, the speed limiting board, or the like, and the support may be the gantry, the cross rod, the vertical rod, or the like.

In S504, the first bounding box is generated for the target object, and the second bounding box is generated for the support.

In S505, the first bounding box corresponding to the target object and the second bounding box corresponding to the support are acquired.

In some examples, a plurality of bounding boxes are included in the 3D modeling, and at least include the first bounding box corresponding to the target object and the second bounding box corresponding to the support of the target object.

In S506, the association relationship for the adjustment of the target object is obtained according to the spatial position where the first and second bounding boxes are located.

In some example, the first and second bounding boxes may have a 3D form, and thus the association relationship for the adjustment of the target object may be obtained according to the spatial position where the first and second bounding boxes are located.

In S507, the target object is moved towards the support according to the association relationship to obtain the third bounding box corresponding to the adjusted target object, and the third bounding box and the second bounding box appear to fit each other.

In some examples, the association relationship may include a posture such as the relative position or angle between the first and second bounding boxes.

In some examples, in addition to adjusting the posture such as the relative position or angle between the first and second bounding boxes, adjustment processing such as enlarging or reducing may be conducted on the form of the first and second bounding boxes according to the requirement of rendering.

With the embodiments of the present disclosure, the target object and the support in the 3D point cloud data may be accurately identified. In the case where the first and second bounding boxes have the 3D form, the association relationship for the adjustment of the target object may be obtained through the spatial position where the first and second bounding boxes are located, so as to the target object may be automatically and accurately adjusted according to the association relationship, thereby making the target object and the support of the target object do not intersect or overlap, and achieving the effect that the bounding boxes respectively corresponding to the target object and the support of the target object fit each other.

Figure 6:
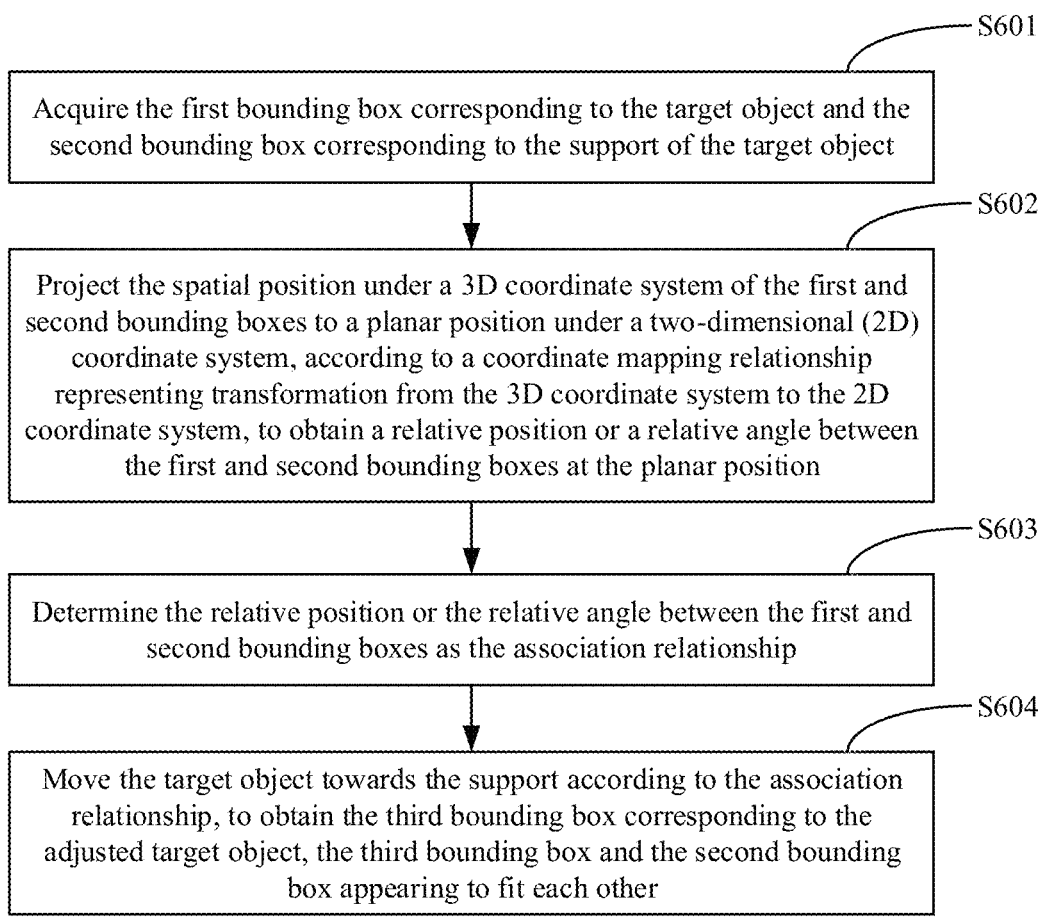
FIG. 6 is a schematic flow diagram of a method for adjusting a target object according to the embodiments of the present disclosure.

According to the embodiments of the present disclosure, the method for adjusting the target object is provided. FIG. 6 is a schematic flow diagram of the method for adjusting the target object according to the embodiments of the present disclosure. As show in FIG. 6, a flow of the method includes the followings.

In S601, the first bounding box corresponding to the target object and the second bounding box corresponding to the support of the target object are acquired.

In some examples, a plurality of bounding boxes are included in the 3D modeling, and at least include the first bounding box corresponding to the target object and the second bounding box corresponding to the support of the target object.

In S602, the spatial position under a 3D coordinate system of the first and second bounding boxes is projected to a planar position under a two-dimensional (2D) coordinate system, according to a coordinate mapping relationship representing transformation from the 3D coordinate system to the 2D coordinate system, to obtain a relative position or a relative angle between the first and second bounding boxes at the planar position.

In some examples, the initial form of the first and second bounding boxes may be the 3D form. In order to improve processing efficiency, the data dimension may be reduced, so that the initial form of the first and second bounding boxes is projected to a target form which may be a 2D form. For example, a bounding box in the 3D form may be orthogonally projected from 3D to 2D to obtain a bounding box in the 2D form. In other words, by orthogonally projecting the first and second bounding boxes from the 3D form to the 2D form, at the planar position under the 2D coordinate system, it may not only conduct the adjustment more conveniently, but also reduce operation cost and improve operation speed compared with the adjustment under the 3D coordinate system.

In S603, the relative position or the relative angle between the first and second bounding boxes are determined as the association relationship.

In S604, the target object is moved towards the support according to the association relationship, to obtain the third bounding box corresponding to the adjusted target object, and the third bounding box and the second bounding box appear to fit each other.

In some examples, the association relationship may include a posture such as the relative position or angle between the first and second bounding boxes.

In some examples, in addition to adjusting the posture such as the relative position or angle between the first and second bounding boxes, adjustment processing such as enlarging or reducing may be conducted on the form of the first and second bounding boxes according to the requirement of rending.

With the embodiments of the present disclosure, the first and second bounding boxes may be transformed from the initial 3D form to the target 2D form, so as to achieve a goal of reducing the data dimension. After reducing the data dimension, by adjusting the target object according to the association relationship at the planar position under the 2D coordinate system, it may not only conduct the adjustment more conveniently, but also reduce the operation cost and improve the operation speed compared with the adjustment under the 3D coordinate system.

Based on an implementation of the above embodiments, the method further includes establishing parent and child types between the first and second bounding boxes. The first bounding box is determined as the child type, and the second bounding box is determined as the parent type.

In some examples, since the target object such as the sign, the indicator board, and the speed limiting board, and the support of the target object such as the gantry, the cross rod, and the vertical rod are calculated by a numerical value, a type, an identification, and the like, in computer operation, in order to adjust the target object more accurately, it may distinguish whether a current object is the target object or the support of the target object by the type. The type used for distinguishing may be the parent and child types. The first bounding box of the target object has the child type, and the second bounding box of the support has the parent type, so that the target object may be aligned to the support by taking the support as a reference object, and the target object and the support are aligned with each other at the relative position or angle, thereby achieving an effect of fitting.

Based on an implementation of the above embodiments, the method further includes determining the support as the reference object for the adjustment of the target object, according to the parent and child types. With the embodiments of the present disclosure, by determining the reference object before adjusting the target object, the target object may be automatically calibrated during the subsequent adjustment of the target object. In a case where the reference object is the support, the target object is aligned to the support, and the target object and the support are aligned with each other at the relative position or the relative angle.

Based on an implementation of the above embodiments, moving the target object towards the support according to the association relationship to obtain the third bounding box corresponding to the adjusted target object includes: moving the target object towards the support determined as the reference object, according to the association relationship. The adjustment processing for aligning the target object with respect to the support is performed in at least one dimension direction among front and back, left and right, or up and down, until the third bounding box and the second bounding box appear to fit each other. With the implementation, the support may be taken as the reference object, the target object may be aligned to the support, and they are aligned with each other at the relative position or the relative angle. Furthermore, the adjustment is conducted on the target object in at least one dimension direction among front and back, left and right, or up and down, rather than only in one dimension direction, until the third bounding box and the second bounding box appear to fit each other. With the adjustment in at least one dimension direction, calibration is conducted in one dimension direction or jointly conducted in multiple dimension directions according to the requirement of rendering, so as to satisfy requirements of rendering of different scenes.

Considering that in the related art, the 3D modeling is directly performed based on the bounding boxes, it is not only inaccurate, but also costly to conduct subsequent manual adjustment and calibration in a 3D scene. With the above embodiments of the present disclosure, the association relationship between the plurality of bounding boxes which at least include the first bounding box corresponding to the target object and the second bounding box corresponding to the support may be automatically calculated through the spatial position, so that the relative position or angle among the plurality of bounding boxes may be automatically adjusted according to the association relationship. Through the accurate adjustment, the cost is reduced, the accuracy is improved, and an effect that the target object and the support fit each other is achieved.

Figure 7:
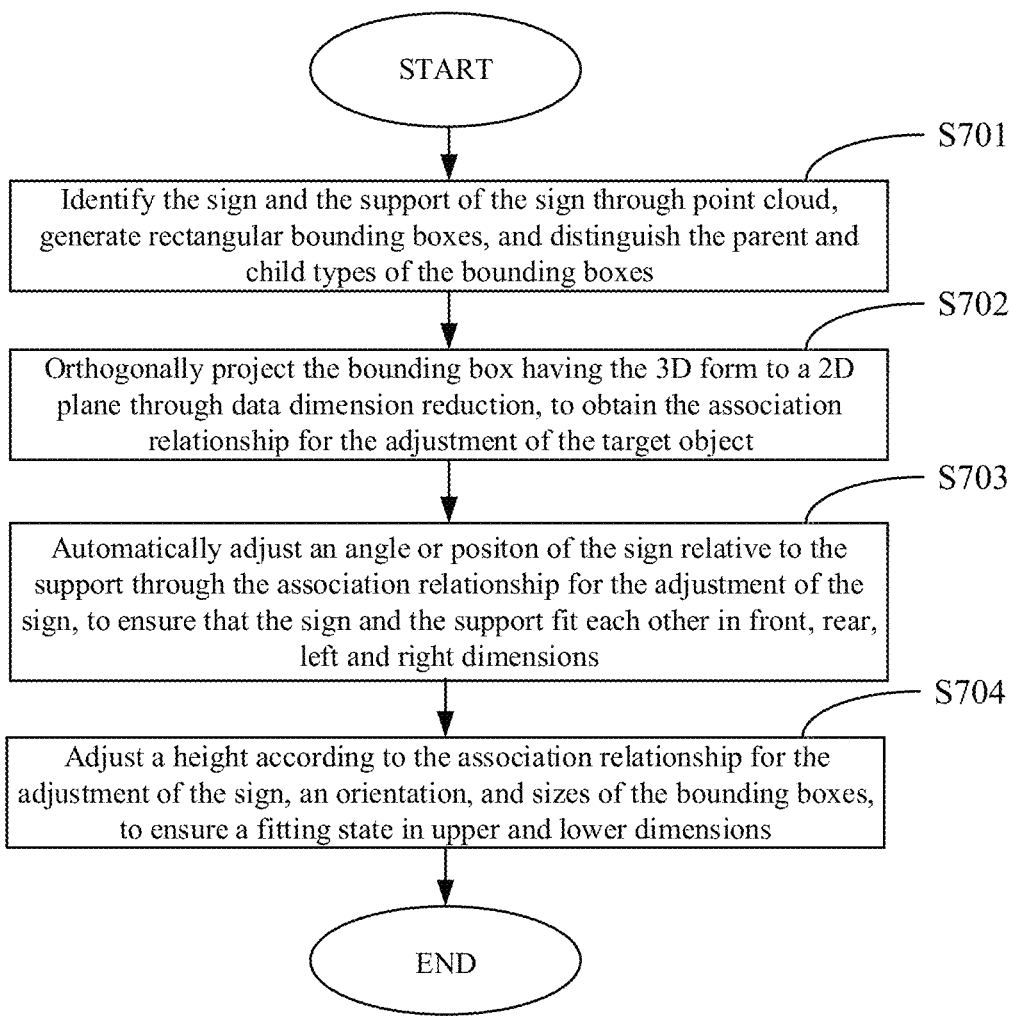
FIG. 7 is a schematic flow diagram of an application example of a method for adjusting a target object according to the embodiments of the present disclosure.

In an application example, as shown in FIG. 7, a flow of the adjustment of the target object includes the followings.

In S701, the sign and the support of the sign such as the gantry, the cross rod, the vertical rod, are identified through point cloud, rectangular bounding boxes are generated, and the parent and child types of the bounding boxes are distinguished.

In some examples, the first bounding box corresponding to the sign may have the child type of the parent and child types, and is recorded as a child bounding box, and the second bounding box corresponding to the support carrying the sign may have the parent type of the parent and child types, and is recorded as a parent bounding box.

Figure 8:
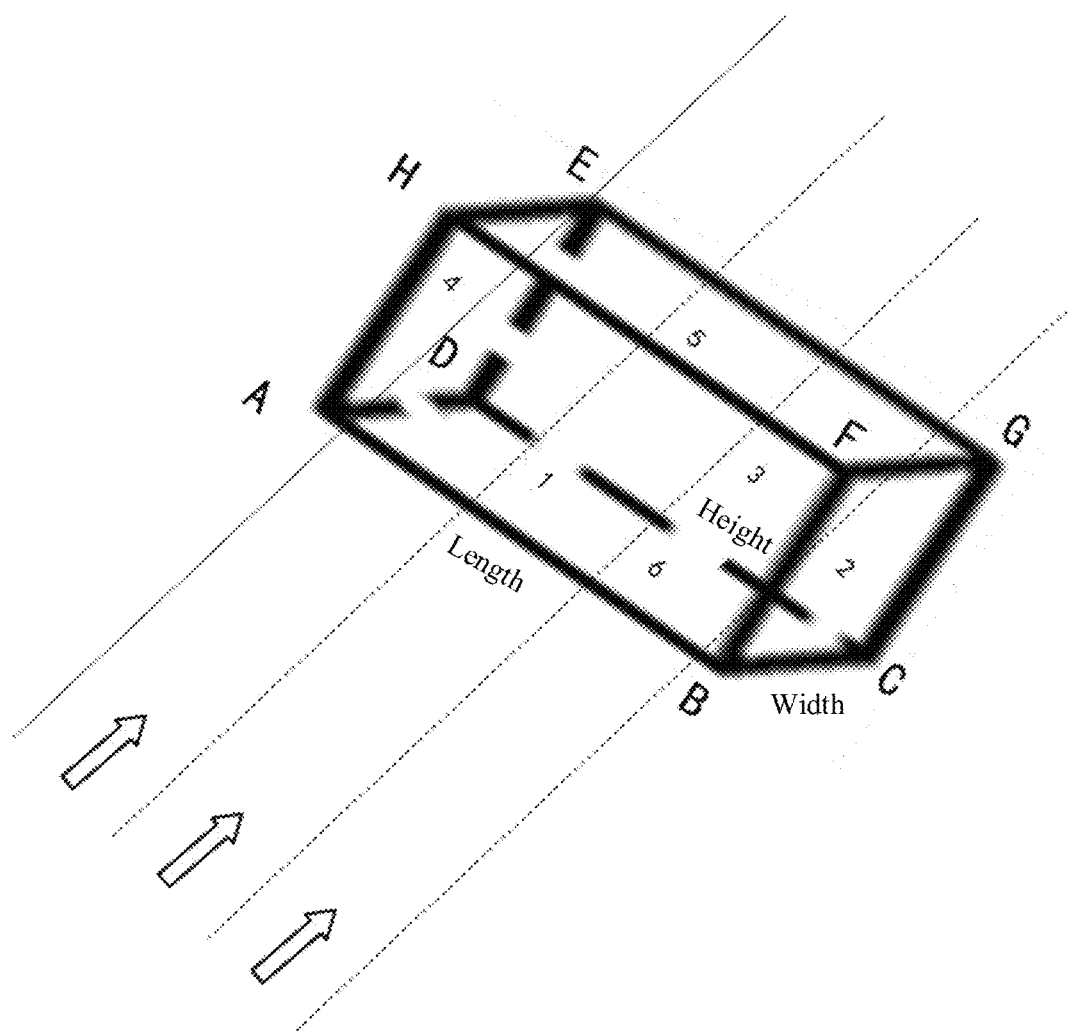
FIG. 8 is a schematic diagram of a 3D bounding box of an application example of a method for adjusting a target object according to the embodiments of the present disclosure.

In some examples, a plane of the bounding box opposite to a driving direction of the road may be recorded as a front plane which is shown as a plane defined by vertexes "A-B-F-H" in FIG. 8, an edge of the bounding box perpendicular to the road may be recorded as a long edge, and an edge of the bounding box parallel to the road may be recorded as a short edge. It is defaulted that pitch angles of all bounding boxes are 0, that is, all bounding boxes are parallel to the ground. It should be noted that an order of vertexes of the 3D bounding box as shown in FIG. 8 is set to clarify a 2D plane to which the sign will be projected after the bounding box having the 3D form is transformed from the 3D coordinate system to the 2D coordinate system, and each 2D plane may be identified by corresponding four vertexes, for example, the sign is projected to a plane defined by vertexes "A-B-C-D", that is a plane along a road direction.

In S702, the bounding box having the 3D form is orthogonally projected to a 2D plane through data dimension reduction, to obtain the association relationship for the adjustment of the target object.

Figure 9:
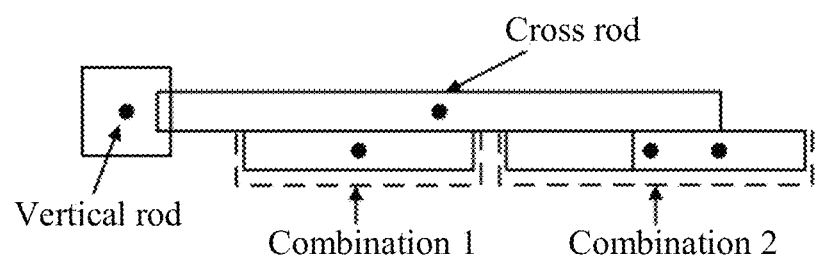
FIGS. 9-13 are schematic diagrams of multi-dimensional adjustment of an application example of a method for adjusting a target object according to the embodiments of the present disclosure.

In some examples, as shown in FIG. 9, with respect to the bounding box in a top view angle, an association relationship between the support such as the cross rod or the vertical rod and each sign, as well as a relative position between respective signs, may be determined through the parent and child types and the spatial position. A combination 1 represents a first sign and its bounding box, and a combination 2 represents a second sign and its bounding box. For example, a bounding box of the cross rod is expanded by 0.5 m, and a sign intersecting the cross rod is determined to be associated with the cross rod. For example, a bounding box of the vertical rod is expanded by 0.5 m, and a sign intersecting the vertical rod is determined to be associated with the vertical rod. The cross rod intersecting the vertical rod is determined to be associated with the vertical rod, and the sign intersecting the cross rod is determined to be associated with the cross rod.

In some examples, when there is overlap between respective signs, an upper and lower relationship may be determined through elevation values. A multi-level layer by layer association is conducted by associating an upper sign having a large elevation value with a lower sign having a small elevation value, and a relative position relationship between the upper and lower signs is recorded.

In S703, an angle or positon of the sign relative to the support is automatically adjusted through the association relationship for the adjustment of the sign, to ensure that the sign and the support fit each other in front, rear, left and right dimensions.

Figure 10:
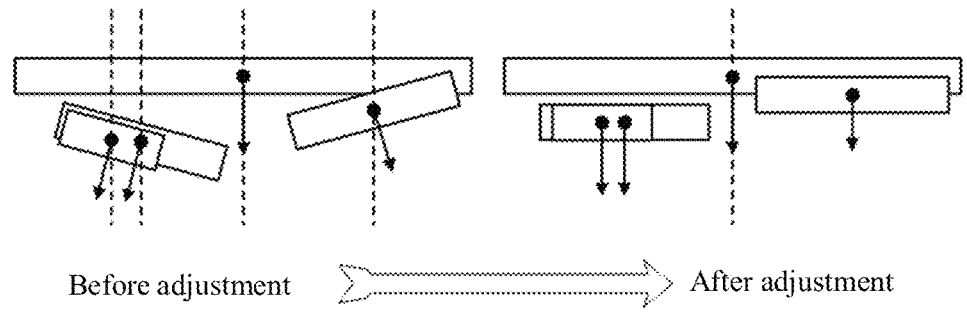

In some examples, as shown in FIG. 10, adjustment for the angle such as a heading angle may be adjustment of the heading angle of the child bounding box, so that the heading angle of the child bounding box is consistent with that of the parent bounding box, and projection planes of the child and parent bounding boxes are parallel to each other. In FIG. 10, the dotted line represents a calibration angle after the adjustment, and the solid line represents an offset angle with an error before the adjustment. That is, a centerline in a direction of a center point of each bounding box needs to be matched to a position of the dotted line, from an arrow direction before the adjustment, so as to reach the calibration angle after the adjustment, that is, the arrow direction of the center point of each bounding box is adjusted to a downward vertical direction.

Figure 11A:
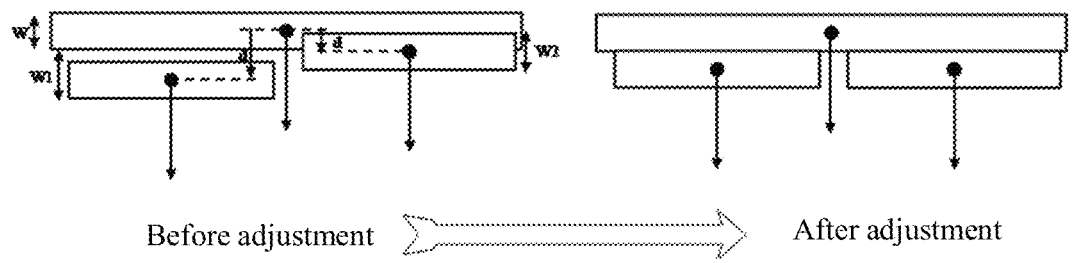
Figure 11B:
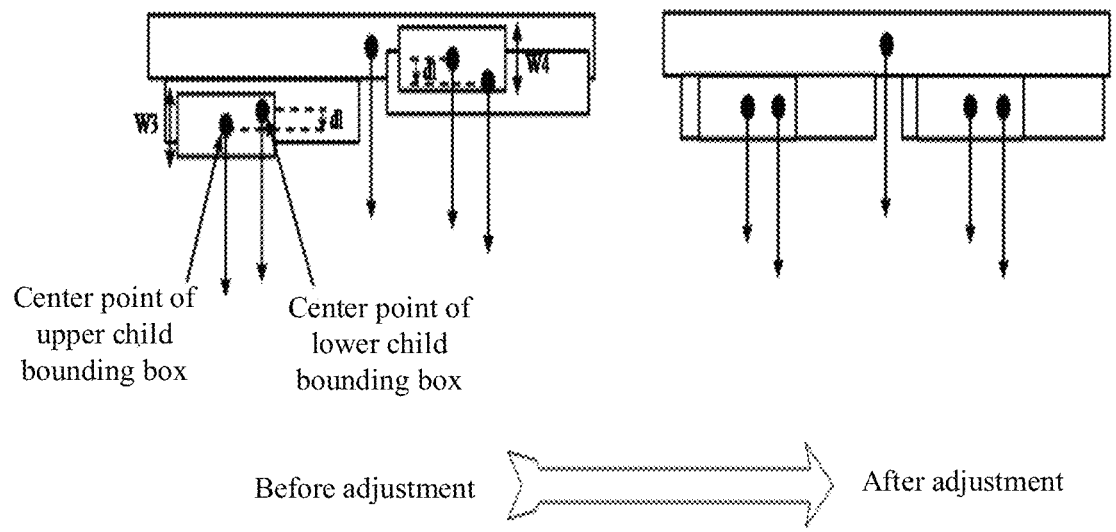

In some examples, for the processing of front and back fitting, as shown in FIG. 11a and FIG. 11b, an adjustment distance for fitting the sign may be calculated through a width value W of the bounding box, and adjustment methods of single-level association and multi-level association are included.

As shown in FIG. 11a, with respect to the adjust method of single-level association, an adjustment principle of achieving the effecting of fitting lies in that a vertical distance d between the center points of the parent and child bounding boxes is a half of a sum (W+W1) of widths of the parent and child bounding boxes, or a half of a sum (W+W2) of widths of the parent and child bounding boxes. Taking the parent bounding box as the reference object, the child bounding box of the sign associated with the parent bounding box is moved forward or backward a vertical moving distance $\Delta d$.

As shown in FIG. 11b, with respect to the adjust method of multi-level association, which differs from the FIG. 11a, the plurality of signs on the support intersects with each other or do not fit each other, and the adjustment principle of achieving the effecting of fitting lies in that in that a vertical distance d between the center points of the parent and child bounding boxes is a half of a sum (W+W1) of widths of the parent and child bounding boxes, or a half of a sum (W+W2) of widths of the parent and child bounding boxes, and a vertical distance d1 between the center points of the child bounding boxes which vertically associate with each other is a half of a difference (W1−W3) of widths of the child bounding boxes which vertically associate with each other, or a difference (W2−W4) of widths of the child bounding boxes which vertically associate with each other. Taking the parent bounding box and the lower child bounding box as the reference object, the child bounding box of the associated sign is moved forward or backward a distance $\Delta d$. In other words, in the case where the plurality of signs are taken as the child bounding boxes, and there is a big class and small class relationship between the child bounding boxes, the child bounding box as a small class is moved to the child bounding box as a big class, to achieve the effect of fitting, and then the child bounding box as the big class is moved to the parent bounding box, to achieve a final fitting effect.

Figure 12:
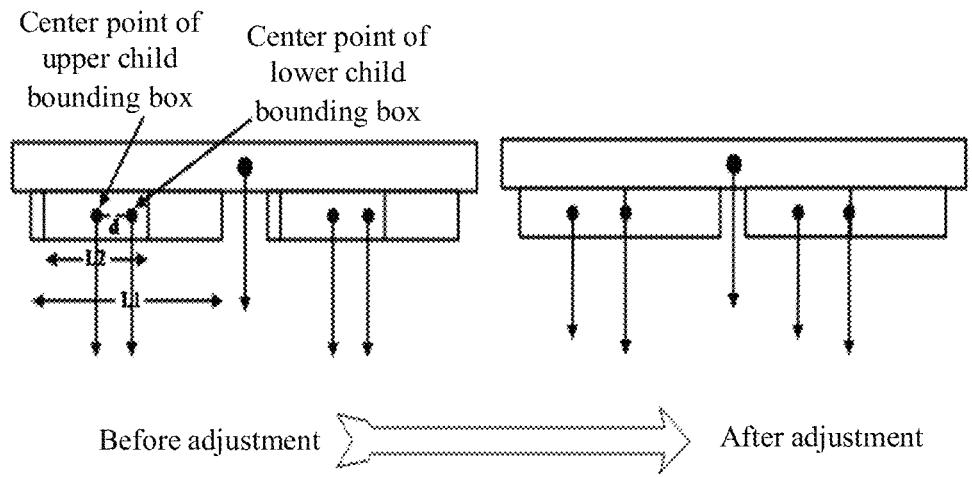

In some examples, for the adjustment for the position, as shown in FIG. 12, it is determined whether left and right adjustment is required according to the recorded relative position of the upper and lower signs. If the relative position records as requiring the left and right adjustment, lift and right fitting shall be conducted. The adjustment principle to achieve the effect of fitting lies in that left or right alignment is performed by moving the center point of the upper child bounding box to left or right, until a vertical distance d between the upper and lower child bounding boxes is a half of a difference (L1−L2) of lengths of the bounding boxes.

In S704, a height is adjusted according to the association relationship for the adjustment of the sign, an orientation, and sizes of the bounding boxes, to ensure a fitting state in upper and lower dimensions.

Figure 13:
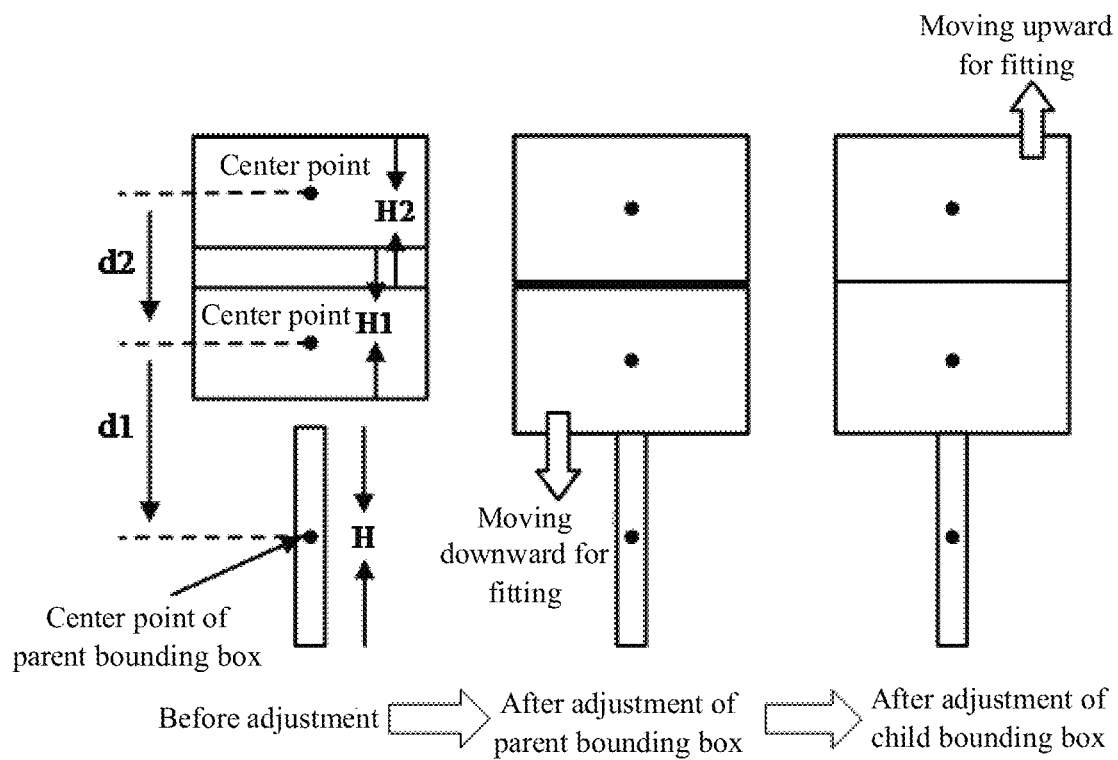

In some examples, if the parent bounding box overlaps with the child bounding box in a vertical direction, no adjustment is required. As shown in FIG. 13, if there is a gap between the parent and child bounding boxes in the vertical direction, a fitting process is required, and a principle for determining that the effect of fitting is achieved lies in the followings.

A height difference is determined according to heights and the center points of the parent and child bounding boxes. If $d1 \le (H+H1)/2$, it is determined that the parent and child bounding boxes overlap with each other in the vertical direction, and thus no adjustment is required. If $d1>(H+H1)/2$, it is determined that there is the gap between the parent and child bounding boxes, and thus taking the parent bounding box as the reference object, the child bounding box is moved downward, until $d1 \le (H1+H2)/2$, where d is the height difference between the center points of the bounding boxes, and H is a height of the bounding box.

In some examples, as shown in FIG. 13, the fitting process is required if two vertically associated child bounding boxes overlap with each other in the vertical direction, and no adjustment is required if there is a gap between them in the vertical direction. A principle for determining that the effect of fitting is achieved lies in the followings.

A height difference is determined according to heights and the center points of the two vertically associated child bounding boxes. If $d2 \ge (H1+H2)/2$, it is determined that the two child bounding boxes fit each other in the vertical direction or there is a gap between the two child bounding boxes in the vertical direction, and thus no adjustment is required. If $d2<(H1+H2)/2$, the two child bounding boxes overlap with each other, and thus taking the lower child bounding box as the reference object, the upper child bounding box is moved upward, until $d2 \ge (H1+H2)/2$, where d is the height difference between the center points of the bounding boxes, and H is the height of the bounding box.

With the application example, omni-directional adjustment for the plurality of bounding boxes having the 3D form is automatically achieved, so as to align the target object to the support, thereby achieving the effect of fitting, shorting a period of data correction, reducing human-hours, and ensuring a refined rendering effect to a road facility.

Figure 14:
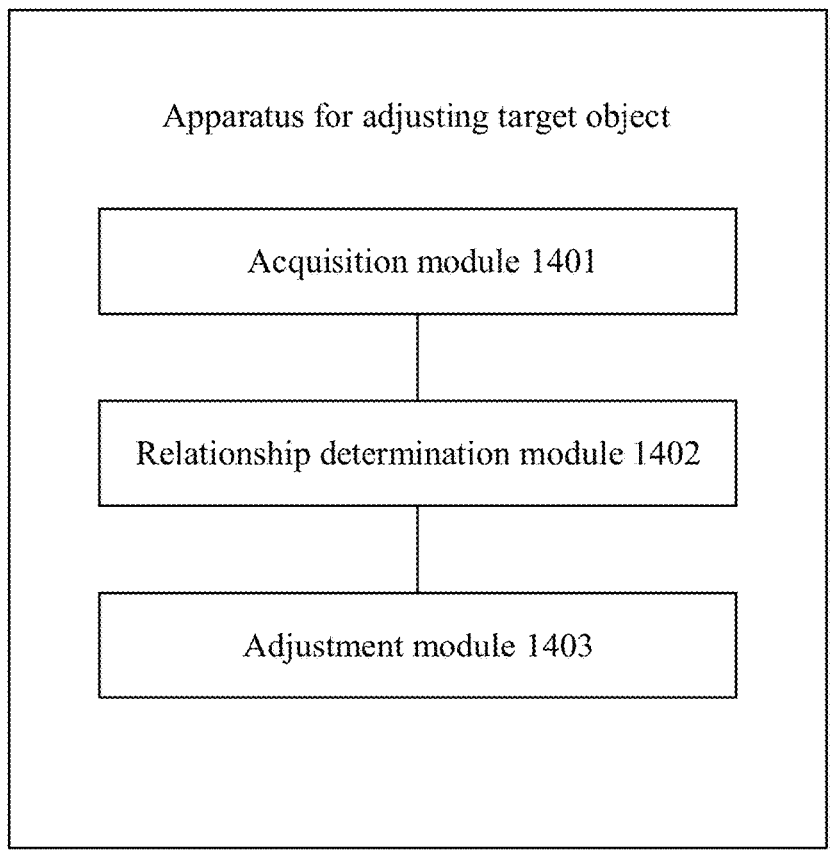
FIG. 14 is a schematic diagram of a structural composition of an apparatus for adjusting a target object according to the embodiments of the present disclosure.

According to the embodiments of the present discourse, an apparatus for adjusting a target object is provided. FIG. 14 is a schematic diagram of a structural composition of the apparatus for adjusting the target object according to the embodiments of the present disclosure. As shown in FIG. 14, the apparatus for adjusting the target object includes an acquisition module 1401 configured to acquire a first bounding box corresponding to the target object and a second bounding box corresponding to a support of the target object, a relationship determination module 1402 configured to obtain the association relationship for adjustment of the target object, according to a spatial position where the first and the second bounding boxes are located, and an adjustment module 1403 configured to move, according to the association relationship, the target object towards, to obtain a third bounding box corresponding to the adjusted target object, the third bounding box and the second bounding box appearing to fit each other.

In an implementation, the apparatus further includes an identification module configured to acquire 3D point cloud data, identify feature points in the 3D point cloud data respectively corresponding to the target object and the support, by using a feature matching manner, identify the target object and the support, according to the feature points respectively corresponding to the target object and the support, generate the first bounding box for the target object, and generate the second founding box for the support.

In an implementation, the relationship determination module 1402 is configured to project, according to a coordinate mapping relationship representing transformation from a 3D coordinate system to a 2D coordinate system, the spatial position under the 3D coordinate system of the first and second bounding boxes to a planar position under the 2D coordinate system, to obtain a relative position or a relative angle between the first and second bounding boxes at the planar position, and determine the relative position or the relative angle between the first and second bounding boxes as the association relationship.

In an implementation, the apparatus further includes an establishment module configured to establish parent and child types between the first and second bounding boxes, where the first bounding box is determined as the child type, and the second bounding box is determined as the parent type.

In an implementation, the apparatus further includes a determination module configured to determine the support as a reference object for the adjustment of the target object, according to the parent and child types.

In an implementation, the adjustment module 143 is configured to move the target object towards the support determined as the reference object, according to the association relationship, and perform the adjustment processing for aligning the target object with respect to the support in at least one dimension direction among front and back, left and right, or up and down, until the third bounding box and the second bounding box appear to fit each other.

Acquisition, storage and application of a user's personal information involved in the technical solution of the present application all comply with provisions of relevant laws and regulations, and do not violate public order and good customs.

According to the embodiments of the present disclosure, the present disclosure also provides an electronic device, a readable storage medium and a computer program product.

Figure 15:
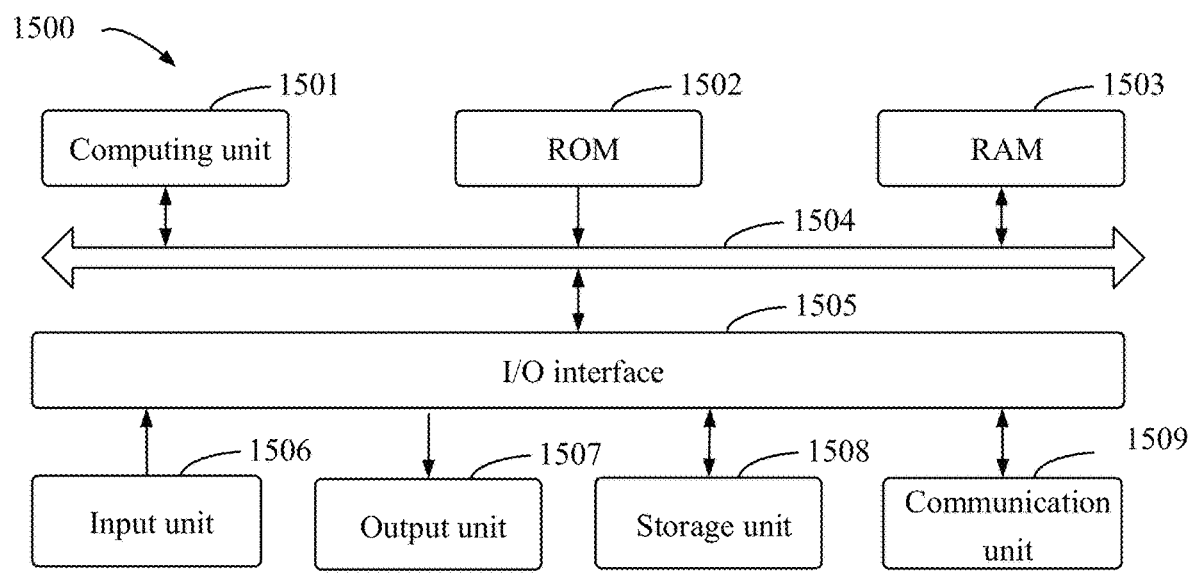
FIG. 15 is a block diagram of electronic device for implementing a method for adjusting a target object according to the embodiments of the present disclosure.

FIG. 15 is a schematic block diagram of an exemplary electronic device 1500 which may implement the embodiments of the present disclosure. The electronic device is intended to represent various forms of digital computers, such as a laptop, a desktop, a workstation, a personal digital assistant, a server, a blade server, a mainframe computer, and other suitable computers. The electronic device may also represent various forms of mobile devices, such as a personal digital processing, a cellular phone, a smart phone, a wearable device and other similar computing devices. The components shown herein, their connections and relationships, and their functions are merely examples, and are not intended to limit the implementation of the present disclosure described and/or required herein.

As shown in FIG. 15, the electronic device 1500 includes a computing unit 1501 that may perform various appropriate actions and processes according to a computer program stored in a Read-Only Memory (ROM) 1502 or a computer program loaded from a storage unit 1508 into a Random-Access Memory (RAM) 1503. Various programs and data required for an operation of electronic device 1500 may also be stored in the RAM 1503. A computing unit 1501, the ROM 1502 and the RAM 1503 are connected to each other through a bus 1504. An input/output (I/O) interface 1505 is also connected to the bus 1504.

A plurality of components in the electronic device 1500 are connected to the I/O interface 1505, and include an input unit 1506 such as a keyboard, a mouse, or the like; an output unit 1507 such as various types of displays, speakers, or the like; the storage unit 1508 such as a magnetic disk, an optical disk, or the like; and a communication unit 1509 such as a network card, a modem, a wireless communication transceiver, or the like. The communication unit 1509 allows the electronic device 1500 to exchange information/data with other devices through a computer network such as the Internet and/or various telecommunication networks.

The computing unit 1501 may be various general-purpose and/or special-purpose processing components with processing and computing capabilities. Some examples of the computing unit 1501 include, but are not limited to, a Central Processing Unit (CPU), a Graphics Processing Unit (GPU), various dedicated Artificial Intelligence (AI) computing chips, various computing units that run machine learning model algorithms, a Digital Signal Processor (DSP), and any appropriate processors, controllers, microcontrollers, or the like. The computing unit 1501 performs various methods and processing described above, such as the above method for adjusting the target object. For example, in some implementations, the above method for adjusting the target object may be implemented as a computer software program tangibly contained in a computer-readable medium, such as the storage unit 1508. In some implementations, a part or all of the computer program may be loaded and/or installed on the electronic device 1500 via the ROM 1502 and/or the communication unit 1509. When the computer program is loaded into RAM 1503 and executed by the computing unit 1501, one or more steps of the method for adjusting the target object described above may be performed. Alternatively, in other implementations, the computing unit 1501 may be configured to perform the above method for adjusting the target object by any other suitable means (e.g., by means of firmware).

Various implements of the system and technologies described above herein may be implemented in a digital electronic circuit system, an integrated circuit system, a Field Programmable Gate Array (FPGA), an Application Specific Integrated Circuit (ASIC), Application Specific Standard Parts (ASSP), a System on Chip (SOC), a Complex Programmable Logic Device (CPLD), a computer hardware, firmware, software, and/or a combination thereof. These various implementations may be implemented in one or more computer programs, and the one or more computer programs may be executed and/or interpreted on a programmable system including at least one programmable processor. The programmable processor may be a special-purpose or general-purpose programmable processor, may receive data and instructions from a storage system, at least one input device, and at least one output device, and transmit the data and the instructions to the storage system, the at least one input device, and the at least one output device.

The program code for implementing the method of the present disclosure may be written in any combination of one or more programming languages. The program code may be provided to a processor or controller of a general-purpose computer, a special-purpose computer or other programmable data processing devices, which enables the program code, when executed by the processor or controller, to cause the function/operation specified in the flowchart and/or block diagram to be implemented. The program code may be completely executed on a machine, partially executed on the machine, partially executed on the machine as a separate software package and partially executed on a remote machine, or completely executed on the remote machine or a server.

In the context of the present disclosure, a machine-readable medium may be a tangible medium, which may contain or store a procedure for use by or in connection with an instruction execution system, device or apparatus. The machine-readable medium may be a machine-readable signal medium or a machine-readable storage medium. The machine-readable medium may include, but is not limited to, an electronic, magnetic, optical, electromagnetic, infrared or semiconductor system, device or apparatus, or any suitable combination thereof. More specific examples of the machine-readable storage medium may include electrical connections based on one or more lines, a portable computer disk, a hard disk, a Random-Access Memory (RAM), a Read-Only Memory (ROM), an Erasable Programmable Read-Only Memory (EPROM or a flash memory), an optical fiber, a portable Compact Disc Read-Only Memory (CD-ROM), an optical storage device, a magnetic storage device, or any suitable combination thereof.

In order to provide interaction with a user, the system and technologies described herein may be implemented on a computer that has: a display apparatus (e.g., a cathode ray tube (CRT) or a Liquid Crystal Display (LCD) monitor) for displaying information to the user; and a keyboard and a pointing device (e.g., a mouse or a trackball) through which the user may provide input to the computer. Other types of devices may also be used to provide interaction with the user. For example, feedback provided to the user may be any form of sensory feedback (e.g., visual feedback, auditory feedback, or tactile feedback), and the input from the user may be received in any form (including an acoustic input, a voice input, or a tactile input).

The system and technologies described herein may be implemented in a computing system (which serves as, for example, a data server) including a back-end component, or in a computing system (which serves as, for example, an application server) including a middleware, or in a computing system including a front-end component (e.g., a user computer with a graphical user interface or web browser through which the user may interact with the implementation of the system and technologies described herein), or in a computing system including any combination of the back-end component, the middleware component, or the front-end component. The components of the system may be connected to each other through any form or kind of digital data communication (e.g., a communication network). Examples of the communication network include a Local Area Network (LAN), a Wide Area Network (WAN), and the Internet.

A computer system may include a client and a server. The client and server are generally far away from each other and usually interact with each other through a communication network. A relationship between the client and the server is generated by computer programs running on corresponding computers and having a client-server relationship with each other. The server may be a cloud server, a distributed system server, or a block chain server.

It should be understood that, the steps may be reordered, added or removed by using the various forms of the flows described above. For example, the steps recorded in the present disclosure can be performed in parallel, in sequence, or in different orders, as long as a desired result of the technical scheme disclosed in the present disclosure can be realized, which is not limited herein.

The foregoing specific implementations do not constitute a limitation on the protection scope of the present disclosure. Those having ordinary skill in the art should understand that, various modifications, combinations, sub-combinations and substitutions may be made according to a design requirement and other factors. Any modification, equivalent replacement, improvement or the like made within the spirit and principle of the present disclosure shall be included in the protection scope of the present disclosure.

What is claimed is:

1. A method for adjusting a target object, comprising:
    establishing parent and child types between a first bounding box and a second bounding box, wherein the first bounding box is determined as the child type, the second bounding box is determined as the parent type, and the first bounding box and the second bounding box are three-dimensional bounding boxes;
    determining a support of the target object as a reference object for adjustment of the target object, according to the parent and child types, wherein the target object and the support pertain to road facilities, the target object includes a sign, an indicator board, or a speed limiting board, and the support includes a gantry, a cross rod, or a vertical rod;
    acquiring the first bounding box corresponding to the target object;
    acquiring the second bounding box corresponding to the support;
    obtaining an association relationship for the adjustment of the target object, according to a spatial position where the first and second bounding boxes are located; and
    moving, according to the association relationship, the target object towards the support, to obtain a third bounding box corresponding to the adjusted target object,
    wherein the third bounding box and the second bounding box appear to fit each other, which represents that the third bounding box and the second bounding box do not intersect with each other and there is no hollow or gap between the third bounding box and the second bounding box.

2. The method of claim 1, further comprising:
    acquiring a three-dimensional (3D) point cloud data;
    identifying feature points in the 3D point cloud data respectively corresponding to the target object and the support, by using a feature matching manner;
    identifying the target object and the support, according to the feature points respectively corresponding to the target object and the support; and
    generating the first bounding box for the target object and the second bounding box for the support.

3. The method of claim 2, wherein obtaining the association relationship for the adjustment of the target object, according to the spatial position where the first and second bounding boxes are located, comprises:
    projecting, according to a coordinate mapping relationship representing transformation from a 3D coordinate system to a two-dimensional (2D) coordinate system, the spatial position under the 3D coordinate system of the first and second bounding boxes to a planar position under the 2D coordinate system, to obtain a relative position or a relative angle between the first and second bounding boxes at the planar position; and
    determining the relative position or the relative angle between the first and second bounding boxes as the association relationship.

4. The method of claim 1, wherein moving, according to the association relationship, the target object towards the support, to obtain the third bounding box corresponding to the adjusted target object, comprises:
- moving the target object towards the support determined as the reference object, according to the association relationship; and
- performing adjustment processing for aligning the target object with respect to the support in at least one dimension direction among front and back, left and right, or up and down, until the third bounding box and the second bounding box appear to fit each other.

5. An electronic device, comprising:
- at least one processor; and
- a memory connected in communication with the at least one processor;
- wherein the memory stores an instruction executable by the at least one processor, and the instruction, when executed by the at least one processor, enables the at least one processor to execute:
  - establishing parent and child types between a first bounding box and a second bounding box, wherein the first bounding box is determined as the child type, the second bounding box is determined as the parent type, and the first bounding box and the second bounding box are three-dimensional bounding boxes;
  - determining a support of a target object as a reference object for adjustment of the target object, according to the parent and child types, wherein the target object and the support pertain to road facilities, the target object includes a sign, an indicator board, or a speed limiting board, and the support includes a gantry, a cross rod, or a vertical rod;
  - acquiring the first bounding box corresponding to the target object;
  - acquiring the second bounding box corresponding to the support;
  - obtaining an association relationship for the adjustment of the target object, according to a spatial position where the first and second bounding boxes are located; and
  - moving, according to the association relationship, the target object towards the support, to obtain a third bounding box corresponding to the adjusted target object,
  - wherein the third bounding box and the second bounding box appear to fit each other, which represents that the third bounding box and the second bounding box do not intersect with each other and there is no hollow or gap between the third bounding box and the second bounding box.

6. The electronic device of claim 5, wherein the instruction, when executed by the at least one processor, enables the at least one processor to further execute:
- acquiring a three-dimensional (3D) point cloud data;
- identifying feature points in the 3D point cloud data respectively corresponding to the target object and the support, by using a feature matching manner;
- identifying the target object and the support, according to the feature points respectively corresponding to the target object and the support; and
- generating the first bounding box for the target object and the second bounding box for the support.

7. The electronic device of claim 6, wherein the instruction, when executed by the at least one processor, enables the at least one processor to further execute:
- projecting, according to a coordinate mapping relationship representing transformation from a 3D coordinate system to a two-dimensional (2D) coordinate system, the spatial position under the 3D coordinate system of the first and second bounding boxes to a planar position under the 2D coordinate system, to obtain a relative position or a relative angle between the first and second bounding boxes at the planar position; and
- determining the relative position or the relative angle between the first and second bounding boxes as the association relationship.

8. The electronic device of claim 5, wherein moving, according to the association relationship, the target object towards the support, to obtain the third bounding box corresponding to the adjusted target object, comprises:
- moving the target object towards the support determined as the reference object, according to the association relationship; and
- performing adjustment processing for aligning the target object with respect to the support in at least one dimension direction among front and back, left and right, or up and down, until the third bounding box and the second bounding box appear to fit each other.

9. A non-transitory computer-readable storage medium storing a computer instruction thereon, wherein the computer instruction is used to cause a computer to execute:
- establishing parent and child types between a first bounding box and a second bounding box. wherein the first bounding box is determined as the child type, the second bounding box is determined as the parent type, and the first bounding box and the second bounding box are three-dimensional bounding boxes;
- determining a support of a target object as a reference object for adjustment of the target object, according to the parent and child types, wherein the target object and the support pertain to road facilities, the target object includes a sign, an indicator board, or a speed limiting board, and the support includes a gantry, a cross rod, or a vertical rod;
- acquiring the first bounding box corresponding to the target object;
- acquiring the second bounding box corresponding to the support;
- obtaining an association relationship for the adjustment of the target object, according to a spatial position where the first and second bounding boxes are located; and
- moving, according to the association relationship, the target object towards the support, to obtain a third bounding box corresponding to the adjusted target object,
- wherein the third bounding box and the second bounding box appear to fit each other, which represents that the third bounding box and the second bounding box do not intersect with each other and there is no hollow or gap between the third bounding box and the second bounding box.

10. The non-transitory computer-readable storage medium of claim 9, wherein the computer instruction is used to cause the computer to further execute:
- acquiring a three-dimensional (3D) point cloud data;
- identifying feature points in the 3D point cloud data respectively corresponding to the target object and the support, by using a feature matching manner;
- identifying the target object and the support, according to the feature points respectively corresponding to the target object and the support; and generating the first bounding box for the target object and the second bounding box for the support.

11. The non-transitory computer-readable storage medium of claim 10, wherein the computer instruction is used to cause the computer to further execute:

projecting, according to a coordinate mapping relationship representing transformation from a 3D coordinate system to a two-dimensional (2D) coordinate system, the spatial position under the 3D coordinate system of the first and second bounding boxes to a planar position under the 2D coordinate system, to obtain a relative position or a relative angle between the first and second bounding boxes at the planar position; and determining the relative position or the relative angle between the first and second bounding boxes as the association relationship.

12. The non-transitory computer-readable storage medium of claim 9, wherein moving, according to the association relationship, the target object towards the support, to obtain the third bounding box corresponding to the adjusted target object, comprises:

moving the target object towards the support determined as the reference object, according to the association relationship; and performing adjustment processing for aligning the target object with respect to the support in at least one dimension direction among front and back, left and right, or up and down, until the third bounding box and the second bounding box appear to fit each other.

* * * * *